Jan. 22, 1924.
I. H. LEVIN
ELECTRODE
1,481,648
Original Filed Feb. 26, 1920
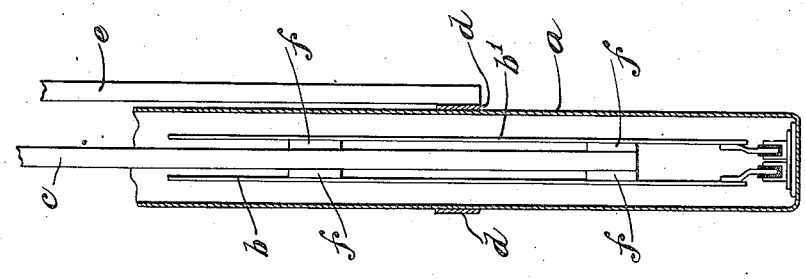
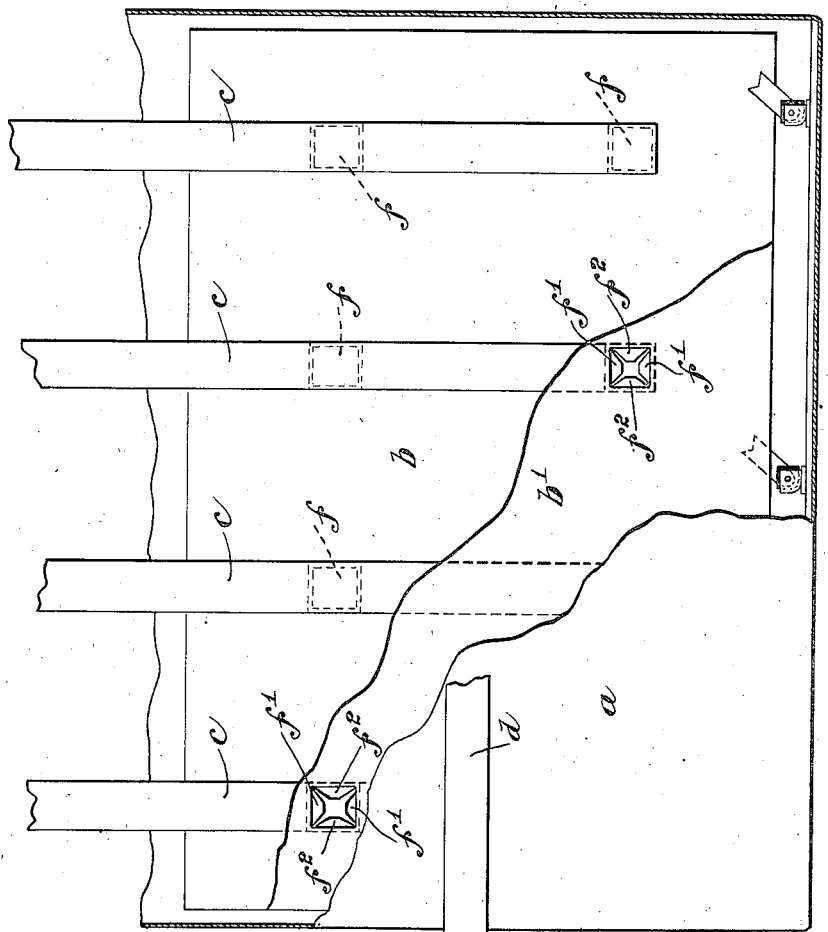

Patented Jan. 22, 1924.

1,481,648

UNITED STATES PATENT OFFICE.

ISAAC H. LEVIN, OF NEW YORK, N. Y.

ELECTRODE.

Application filed February 26, 1920, Serial No. 361,419. Renewed June 16, 1923.

*To all whom it may concern:*

Be it known that I, ISAAC H. LEVIN, a citizen of the United States, residing at the borough of Manhattan, city, county, and State of New York, have invented certain new and useful Improvements in Electrodes, of which the following is a specification, reference being had therein to the accompanying drawings, which form a part thereof.

My invention relates to electrodes, and more particularly to electrodes adapted for use in uni-polar cells for generating oxygen and hydrogen.

Heretofore it has been the practice, in cells of this character, to mechanically and electrically join the terminal bars of the electrodes with the body thereof, adjacent the upper edge of said body. There has always been a current loss in an apparatus of this character, which has generally been attributed to surface tension at the electrodes, resistance of the metal of the terminals and the electrodes, and possible defects in the formation of the electrical joint between the electrodes and the terminal bars. By a judicial selection of the material of the opposed electrodes, the loss from surface tension at the electrodes may be materially decreased, if not wholly eliminated. The joint between the electrodes and the terminal bars may also be, and has been so made as to minimize or prevent loss at this point, and resistance of the metal of the electrodes and terminal bars may be so calculated as to make the loss from this source readily determinable, and to reduce it to a minimum. I have found by experiment that even with the correction of these recognized sources of loss, there is still a current loss or loss of efficiency in the operation of a cell, which cannot be attributed to any of these sources.

In the operation of an electrolytic cell there is a tendency for the concentration of the current adjacent the edges of the electrodes, the path of the current from one electrode to the other not being defined by a mass of electrolyte proportionate to a projection of the area of the electrode of smaller dimensions, but by this area plus substantially the distance between the electrodes, a condition which tends to cause an unequal distribution of the current throughout the electrodes, and an uneven generation of the gases at different portions of the surfaces thereof.

With these conditions in mind, I provide an electrode wherein the terminal bars are so connected therewith electrically as to bring the current to portions of the plate well within the edges thereof, thus causing an effective distribution of the current throughout both electrodes and avoiding that concentration of the current adjacent the edges thereof, particularly along the top edge, which has resulted in the current loss above referred to. In this manner, and by the use of a proper mechanical and electrical connection between the terminal bar or bars and the electrode plate as to the inner electrode, high efficiency in the cell may be secured, which increase in efficiency is particularly desirable in connection with large electrodes such as are used in high output capacity cells which employ electrodes the areas of which are very much greater than those heretofore employed in cells for the generation of oxygen and hydrogen.

The invention consists primarily in an electrode embodying therein a body portion and a terminal bar mechanically and electrically connected with said portion well within the edges thereof whereby an effective distribution of the current is secured through the tendency of the current to concentrate toward the edges of the operative area of the electrode; and in such other novel features of construction and combination of parts as are hereinafter set forth and described, and more particularly pointed out in the claims hereto appended.

Referring to the drawings,

Fig. 1 is a view of an electrolytic couple embodying my invention, partly in elevation and partly in section, one of the plates of the inner electrode being broken away to disclose the terminal bars connected therewith, the diaphragm water circulation system and cover being omitted, and Fig. 2 is a transverse section thereof.

Like letters refer to like parts in both of said views.

In the accompanying drawings I have illustrated the invention in connection with an electrolytic cell of the uni-polar tank type, although if desired, the electrode construction described may be utilized with other types of uni-polar cells.

In the drawings the tank *a* forms the outer electrode or cathode, while the inner electrode which is supported within, while being insulated from, said tank, is shown as being formed of two parallel metallic plates *b—b'* electrically and mechanically connected with the terminal bars *c* so as to present a unitary electrode structure. All characteristics of the cell, excepting those relating to the electrode construction, are omitted from the drawings as being non-essential for an understanding of the present invention.

Extending about and electrically and mechanically connected with the tank *a* at a point substantially midway of the height of the inner electrode plates *b—b'*, is a continuous band *d* of copper or other material having relatively higher electro-conductivity than the material of the tank *a*. Leading from this bar and mechanically and electrically connected therewith is the negative pole of the cell consisting of a terminal bar *e* which may be of any desired material, cross-sectional area or construction as determined by the maximum voltage and amperage of the current used in connection with the battery.

By locating the bar *d* midway of the top and bottom of the tank *a* and extending it completely around said tank while maintaining it in electrical connection therewith at every point, it is apparent that the current led to the cell by the terminal bar *e* will be substantially equally distributed throughout the entire body of said electrodes as a result of the tendency of the current to concentrate toward the top and bottom edges of the tank.

The terminal bars *c* are connected to the plates *b—b'* with the twofold object of electrically and mechanically connecting both plates to said bars at a point well within the edges thereof and preventing resistance at the point of joinder of the terminal bars and said plates, as a result of the penetration or seepage of electrolyte between said plates and said bars about this point of joinder.

Each of the plates *b—b'* are provided with one or a plurality of vertically rectilineally arranged depressions *f* projecting toward the terminal bars *c* with the ends thereof turned inwardly to afford the desired contact area between said bars and the depressed portions of the plates. Since with high output capacity cells, the plates *b—b'* will be fairly thick, I have found it essential, in order to properly form these depressions to pierce the metal along intersecting lines, thus forming two pairs of oppositely disposed tongues *f'—f²* which when formed into angular brackets as shown, will present a continuous edge within the depression along which a welded joint may be formed so as to exclude electrolyte from between said tongues and the bars *c*.

By connecting the plates *b—b'* by means of the depressions *f* with the terminal bars *c*, I not only secure a plurality of points of mechanical and electrical connections between the bars and each of said plates which will impart the desired rigidity thereto when in use, but also provide points of electrical contact well within the edges of the plates *b—b'* and above and below the band *d* so as to secure the desired effective distribution of the current throughout both electrodes and throughout the body of the electrolyte between same. While, in addition to making the electrical connections with both electrodes well within the edges thereof, I may, if desired, make a connection at the top of the plates *b—b'*, I have not found this to produce as satisfactory results as the construction shown.

In the manner described, I utilize the normal tendency of the current to flow upwardly or toward the edges of the electrodes, to secure the effective distribution of the current throughout each electrode within the operative range of the current when decomposing the electrolyte, and thus am enabled to utilize substantially the entire effective current with the decomposition of the electrolyte, current loss from this source being largely, if not entirely eliminated.

This construction has the further advantage as compared with an electrode in which the terminal bar is connected with the plates at one point only, that when the terminal bar is connected with the plates at a plurality of points, lighter plates *b—b'* may be used, and the cross-sectional area of the terminal bar *c* may be so proportioned as to carry a current having the desired E. M. F., the current being divided and delivered to different portions of the plates. Hence, the plates *b—b'* need not have sufficient bulk to carry the entire current, there being no material resistance loss in the plates themselves, notwithstanding the small cross-sectional area of such plates.

It is not my intention to limit the invention to the construction shown in the accompanying drawings, it being apparent that such may be varied without departing from the spirit and scope of the invention. As stated above, those characteristics of the cell relating to the separation of the gases, circulation of the electrolyte, and the accumulation of the gases, is omitted from the drawings, as forming no part of my present invention.

Having described the invention, what I claim as new and desire to have protected by Letters Patent, is:—

1. An electrode embodying therein a body portion and a terminal bar mechanically and electrically connected with said portion well within the edges thereof, whereby an effective distribution of the current is secured through the tendency of the current to concentrate toward the edges of the operative area of the electrode, the thickness of said bar being relatively greater than that of said body, and being so proportioned as to its cross-sectional area as to cause said bar and said body to have substantially the same relative electrical capacity.

2. An electrode embodying therein two oppositely disposed plates each having an inwardly projected depressed portion well within the edges thereof, and a terminal bar positioned between said plates and mechanically and electrically connected therewith by means of said depressed portions, whereby an effective distribution of the current is secured through the tendency of the current to concentrate toward the edges of the operative area of the electrode.

3. An electrode embodying therein two oppositely disposed plates each having an inwardly projected depressed portion well within the edges thereof, the bottom of said depressed portions being formed by a plurality of tongues, and a terminal bar positioned between said plates and mechanically and electrically connected therewith by being welded to said tongues along the edges thereof, whereby an effective distribution of the current is secured through the tendency of the current to concentrate toward the edges of the operative area of the electrode.

4. An electrode embodying therein two oppositely disposed plates each having a plurality of vertically and rectilineally arranged depressed portions well within the edges thereof, and a terminal bar positioned between said plates and mechanically and electrically connected therewith by means of said depressed portions, whereby an effective distribution of the current is secured through the tendency of the current to concentrate toward the edges of the operative area of the electrode.

5. An electrode embodying therein two oppositely disposed plates, a plurality of terminal bars positioned between said plates, and means mechanically and electrically connecting said plates and said bars, comprising a plurality of vertically and rectilineally arranged depressed portions in each of said plates contiguous to each of said bars, and a welded joint between each depressed portion and its associated bar, whereby an effective distribution of the current is secured through the tendency of the current to concentrate toward the edges of the operative area of the electrode.

6. An electrode embodying therein a body portion and a terminal bar mechanically and electrically connected therewith, said bar being of relatively greater thickness than said body and having contact therewith below the top edge thereof, said bar and said body being so proportioned as to have the same electrical capacity.

In witness whereof I have hereunto affixed my signature, in the presence of two subscribing witnesses, this 19th day of Feb. 1920.

ISAAC H. LEVIN.

Witnesses:—
 ADA GOLLNER,
 LENA FRIEDMAN.